(12) United States Patent
Otsuka

(10) Patent No.: US 7,167,702 B2
(45) Date of Patent: Jan. 23, 2007

(54) PORTABLE TELEPHONE SET AND COMMUNICATION INQUIRING METHOD FOR PORTABLE TELEPHONE SET

(75) Inventor: Satoshi Otsuka, Kanagawa (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 10/383,181

(22) Filed: Mar. 6, 2003

(65) Prior Publication Data

US 2004/0203628 A1 Oct. 14, 2004

(30) Foreign Application Priority Data

Mar. 22, 2002 (JP) ............................. 2002-079897

(51) Int. Cl.
*H04M 11/10* (2006.01)
(52) U.S. Cl. .................... 455/413; 455/412.1
(58) Field of Classification Search ............ 455/414.3, 455/412.2, 413, 412.1; 709/203, 206
See application file for complete search history.

(56) References Cited

U.S. PATENT DOCUMENTS

| | | | |
|---|---|---|---|
| 5,444,768 A * | 8/1995 | Lemaire et al. ............... | 379/68 |
| 5,742,905 A | 4/1998 | Pepe et al. | |
| 6,067,561 A | 5/2000 | Dillon | |
| 6,446,114 B1 * | 9/2002 | Bulfer et al. ............... | 709/206 |
| 6,671,508 B1 * | 12/2003 | Mitsuoka et al. ......... | 455/412.1 |
| 2002/0111991 A1 * | 8/2002 | Wood et al. ................. | 709/203 |
| 2003/0013483 A1 * | 1/2003 | Ausems et al. ............. | 455/556 |

FOREIGN PATENT DOCUMENTS

| | | |
|---|---|---|
| EP | 1113631 A2 | 7/2001 |
| JP | H10-322437 | 12/1998 |
| JP | H11-068956 | 3/1999 |
| JP | H11-175428 | 7/1999 |
| JP | 2000-197131 | 7/2000 |
| JP | 2000-341432 | 12/2000 |
| JP | 2001-257762 | 9/2001 |
| WO | WO-00/67436 | 11/2000 |

* cited by examiner

*Primary Examiner*—Duc M. Nguyen
*Assistant Examiner*—Michael Vu
(74) *Attorney, Agent, or Firm*—Scully, Scott, Murphy & Presser, P.C.

(57) ABSTRACT

The present invention provides a portable telephone set and a communication inquiring method wherein an inquiry regarding a telephone answering service and an inquiry regarding a mail service can be executed by one operation to achieve sufficient convenience to common users. When one of an inquiring operation as to whether or not a terminated telephone answering service call by the telephone answering service function is present and another inquiring operation as to whether or not a terminated mail by the mail service function is present is performed, an inquiring action corresponding to the one operation is executed first, and then an inquiring action corresponding to the other operation is automatically executed.

6 Claims, 5 Drawing Sheets

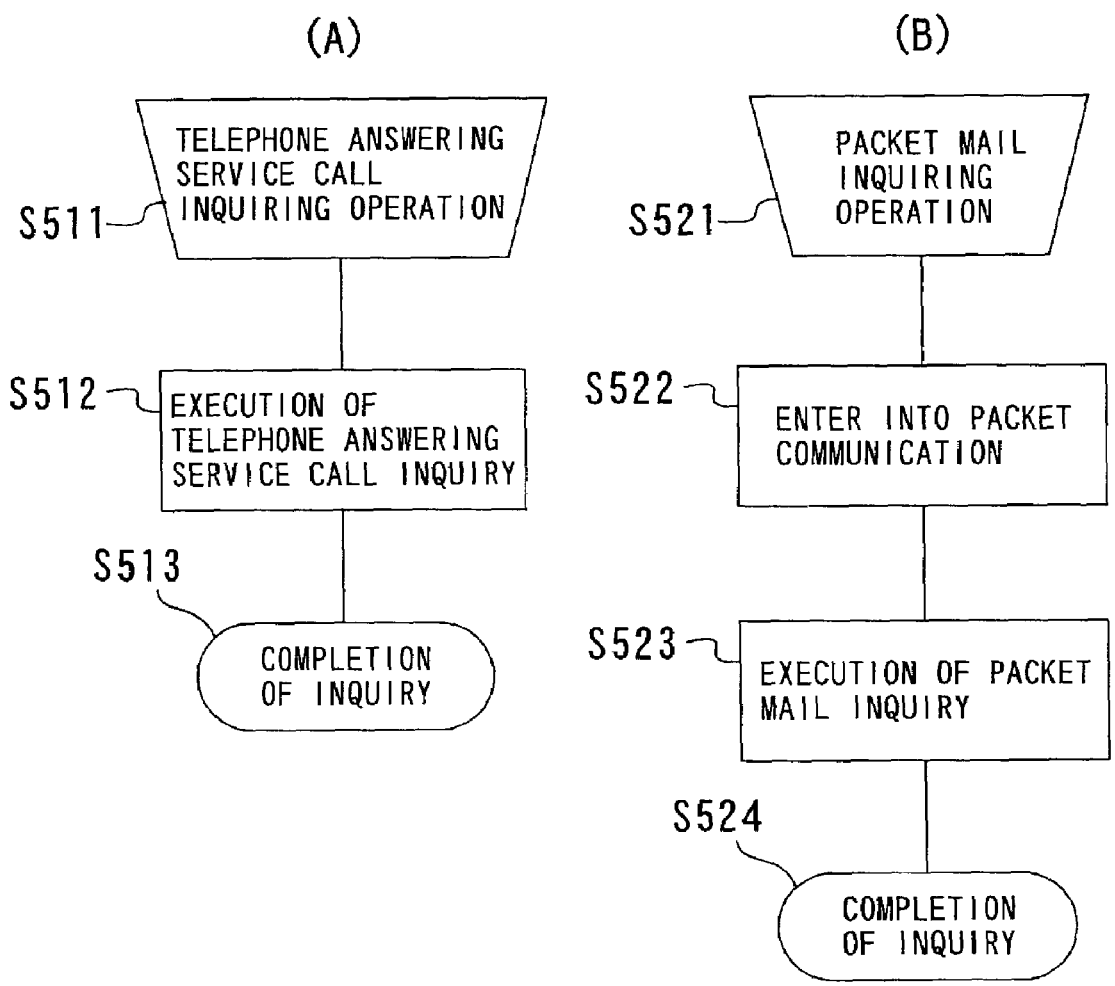

PORTABLE TELEPHONE SET AND COMMUNICATION INQUIRING METHOD FOR PORTABLE TELEPHONE SET

BACKGROUND OF THE INVENTION

1. Field of the Invention

The present invention relates to a portable telephone set and a communication inquiring method for a portable telephone set having both of a telephone answering machine service function for performing termination notification of a telephone answering machine call, transmission of stored communication contents and so forth and a mail service function for performing termination notification of a mail, transmission of contents of a mail prepared for distribution and so forth.

2. Description of the Related Art

Conventionally, for example, in Japanese Patent Laid-Open No. 2000-197131, a portable telephone set is disclosed which can detect a character string corresponding to a telephone number or a mail address in a received character message and originate a telephone call or prepare and transmit a replying message through simple successive operations of a key inputting section so as to easily perform an inquiring process as to a telephone answering service call and an inquiring process as to a mail by operating an operation section.

Further, in Japanese Patent Laid-Open No. 2001-257762, a portable telephone set is disclosed wherein several functions which are selection objects are divided into logical hierarchies so that a plurality of functions can be selected efficiently, and operation keys are matched with the functions so that a function can be selected easily and intuitively.

Furthermore, in Japanese Patent Laid-Open No. 2000-341432, a composite communication apparatus is disclosed wherein reception of a facsimile, reception of a telephone answering service call and reception of an electronic mail can be affirmed by the communication apparatus by itself.

Where the proposals disclosed in Japanese Patent Laid-Open No. 2000-197131 and No. 2001-257762 are used, from a very common viewpoint of simplification of operation, they individually achieve convenience in their own way.

However, in recent years, a portable telephone set has been popularized which is ready for both services of a telephone answering service for performing issuing of a termination notification of a telephone answering service call and transmission of communication contents stored in a memory of a server and a mail service for performing issuing of a termination notification of a mail and transmission of contents of a mail prepared for distribution. However, from the documents mentioned above, a special hint cannot be obtained from a view point that simplification of operation of inquiry as to the services described above is intended to improve the convenience to the subscriber of the portable telephone set.

Meanwhile, in the apparatus disclosed in Japanese Patent Laid-Open No. 2000-341432, reception of a facsimile, reception of a telephone answering service call and reception of an electronic mail can be affirmed by use of a single apparatus. Therefore, simplification in operation of inquiry as to the communication services can be achieved. However, in the proposal disclosed in Japanese Patent Laid-Open No. 2000-341432, since a composite communication apparatus for exclusive use as proposed is required, it is hard to say that sufficient convenience to common users of the portable telephone set is provided.

As well known in the art, the user of a portable telephone set often affirms whether or not a telephone answering service call or a mail is terminated after it has been out of a range for a considerably long period of time or voice communication has continued for a very long period of time. In this case, conventionally an inquiring operation as to a telephone answering service and an inquiring operation as to a mail service have been obliged to perform separately from each other.

FIGS. 5(A) and 5(B) are flowcharts illustrating operation according to such a conventional communication inquiring method as just described. Particularly, FIG. 5(A) is a flow chart illustrating telephone answering service inquiring action. Referring to FIG. 5(A), if a user performs a telephone answering service inquiring operation (step S511), then the telephone answering service inquiring action is executed with a predetermined protocol by the portable telephone set (step S512), and the inquiry is ended immediately (step S513).

FIG. 5(B) is a flow chart illustrating action of inquiry as to whether or not a mail regarding a mail service (in this example, a packet mail) is terminated, and the process of FIG. 5(B) is executed independently of the telephone answering service inquiring action of FIG. 5(A). Referring to FIG. 5(B), if a user performs a packet mail inquiring operation (step S521), then the portable telephone set first enters a mode of packet communication (step S522). Then, inquiring action is executed in accordance with a protocol of packet mail inquiry (step S523), and the inquiry is ended immediately (step S524). This similarly applies to the apparatus disclosed in the prior art documents mentioned hereinabove although they do not specifically disclose this by way of illustration. The prior art documents do not include an idea at all that the two inquiring operations are integrated to improve the convenience in use.

SUMMARY OF THE INVENTION

It is an object of the present invention to provide a portable telephone set and a communication inquiring method wherein an inquiry as to a telephone answering service and an inquiry as to a mail service can be executed by one operation to achieve sufficient convenience to common users.

In order to attain the object described above, according to an aspect of the present invention, there is provided a communication inquiring method for a portable telephone set having two communication functions of a telephone answering service function for performing issuing of a termination notification of a telephone answering service call and transmission of stored communication contents and a mail service function for performing issuing of a termination notification of a mail and transmission of contents of a mail prepared for distribution, comprising a step of automatically executing, when one of an inquiring operation as to whether or not a terminated telephone answering service call by the telephone answering service function is present and another inquiring operation as to whether or not a terminated mail by the mail service function is present is performed, an inquiring action corresponding to the one operation first and then executing an inquiring action corresponding to the other operation.

According to another aspect of the present invention, there is provided a communication inquiring method for a portable telephone set having two communication functions of a telephone answering service function for performing issuing of a termination notification of a telephone answering service call and transmission of stored communication contents and a mail service function for performing issuing of a termination notification of a mail and transmission of contents of a mail prepared for distribution, comprising a step of automatically executing, when one of an inquiring operation as to whether or not a terminated telephone answering service call by the telephone answering service function is present and another inquiring operation as to whether or not a terminated mail by the mail service function is present is performed, an inquiring action having a higher priority order rank set in advance first and then executing an inquiring action corresponding to the other operation.

According to a further aspect of the present invention, there is provided a communication inquiring method for a portable telephone set having two communication functions of a telephone answering service function for performing issuing of a termination notification of a telephone answering service call and transmission of stored communication contents and a mail service function for performing issuing of a termination notification of a mail and transmission of contents of a mail prepared for distribution, comprising a step of automatically executing, when an inquiring operation as to whether or not a terminated telephone answering service call by the telephone answering service function is present is performed, an inquiring action corresponding to the operation first and then executing another inquiring action as to whether or not a terminated mail by the mail service function is present.

According to a still further aspect of the present invention, there is provided a communication inquiring method for a portable telephone set having two communication functions of a telephone answering service function for performing issuing of a termination notification of a telephone answering service call and transmission of stored communication contents and a mail service function for performing issuing of a termination notification of a mail and transmission of contents of a mail prepared for distribution, comprising a step of automatically executing, when an inquiring operation as to whether or not a terminated mail by the mail service function is present is performed, an inquiring action corresponding to the operation first and then executing another inquiring action as to whether or not a terminated telephone answering service call by the telephone answering service function is present.

The mail service function may transmit and receive a mail by packet communication.

According to a yet further of the present invention, there is provided a portable telephone set having two communication functions of a telephone answering service function for performing issuing of a termination notification of a telephone answering service call and transmission of stored communication contents and a mail service function for performing issuing of a termination notification of a mail and transmission of contents of a mail prepared for distribution, comprising an operation section for accepting an operation by a user for a communication inquiry by the telephone answering service function or the mail service function, and control means for automatically executing, when one of an inquiring operation as to whether or not a terminated telephone answering service call by the telephone answering service function is present and another inquiring operation as to whether or not a terminated mail by the mail service function is present is performed, an inquiring action corresponding to the one operation first and then executing another inquiring action corresponding to the other operation.

Preferably, the portable telephone set further comprises order rank selection setting means for selectively setting which one of inquiring actions of an inquiring action as to whether or not a terminated telephone answering service call by the telephone answering service function is present and another inquiring action as to whether or not a terminated mail by the mail service function is present should be executed in priority, and the control means automatically executes, when one of inquiring operations of an inquiring operation as to whether or not a terminated telephone answering call by the telephone answering service function is present and another inquiring operation as to whether or not a terminated mail by the mail service function is present is performed in the operation section, an inquiring action having a higher priority order rank set in advance by the order rank selection setting means first and then executes another inquiring action corresponding to the other operation.

The control means may automatically execute, when an inquiring operation as to whether or not a terminated telephone answering service call by the telephone answering service function is present is performed in the operation section, an inquiring action corresponding to the operation first and then execute another inquiring action as to whether or not a terminated mail by the mail service function is present.

Alternatively, the control means may automatically execute, when an inquiring operation as to whether or not a terminated mail by the mail service function is present is performed in the operation section, an inquiring action corresponding to the operation first and then execute another inquiring action as to whether or not a terminated telephone answering service call by the telephone answering service function is present.

The mail service function may transmit and receive a mail by packet communication.

With the communication inquiring methods for a portable telephone set and the portable telephone set, an inquiry as to a telephone answering service and an inquiry as to a mail service are executed by one operation, and sufficient convenience to common subscribers can be achieved.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIGS. 4(A) and 4(B) are flow charts illustrating a further communication inquiring method to which the present invention is applied, and wherein FIG. 4(A) illustrates setting operation of priority inquiry and FIG. 4(B) illustrates communication inquiring action; and FIGS. 5(A) and 5(B) are flow charts illustrating operation according to a conventional communication inquiring method, and wherein FIG. 5(A) illustrates telephone answering service inquiring action and FIG. 5(B) illustrates packet mail inquiring action.

DESCRIPTION OF THE PREFERRED EMBODIMENT

Figure 1:
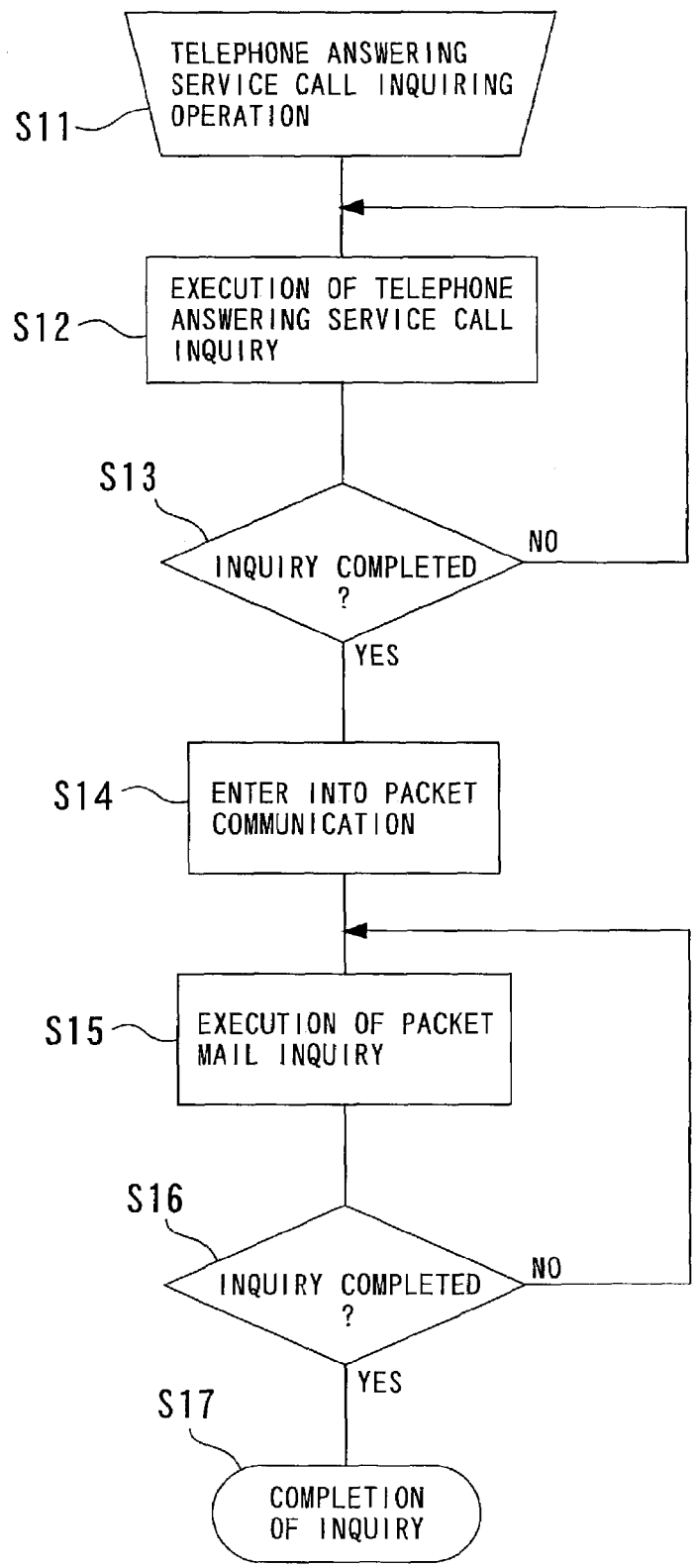
FIG. 1 is a flow chart illustrating a communication inquiring method to which the present invention is applied.

Referring first to FIG. 1, there is illustrated a communication inquiring method to which the present invention is applied. In the method of the present invention, a portable telephone set is used which has both communication functions of a telephone answering service function for performing issuing of a termination notification of a telephone answering service call, transmission of communication contents stored in a storage apparatus and so forth and a mail service function for performing issuing of a termination notification of a mail, transmission of contents of a mail prepared for distribution.

If a user performs an inquiring operation as to whether or not a telephone answering service call by the telephone answering service function is terminated (step S11), then the portable telephone set executes telephone answering service inquiring action with a predetermined protocol (step S12). If it is recognized that the telephone answering service inquiring action is completed (step S13), then the portable telephone set enters a mode of packet communication (step S14). After the packet communication mode is entered, a protocol of packet mail inquiring action in this mode is executed (step S15). If it is recognized that the packet mail inquiring action is completed (step S16), then all of the communication inquiring actions are completed (step S17).

In the embodiment of FIG. 1 and the other embodiments hereinafter described, as a packet mail (packet communication) service which is a mail service, for example, a multiple function type service called "i-mode" which uses a data communication network provided by the Kabushiki Kaisha NTT DoCoMo may be used.

As recognized easily from the flow chart of FIG. 1, according to the method of the present invention, since an inquiry as to a telephone answering service and an inquiry as to a mail service (packet mail) are successively and automatically executed by one inquiring operation, such a troublesome operation that a user is obliged to individually perform a telephone answering service inquiring operation and an inquiring operation as to a mail independently of each other as in the prior art illustrated in FIGS. 5(A) and 5(B) is eliminated.

Figure 2:
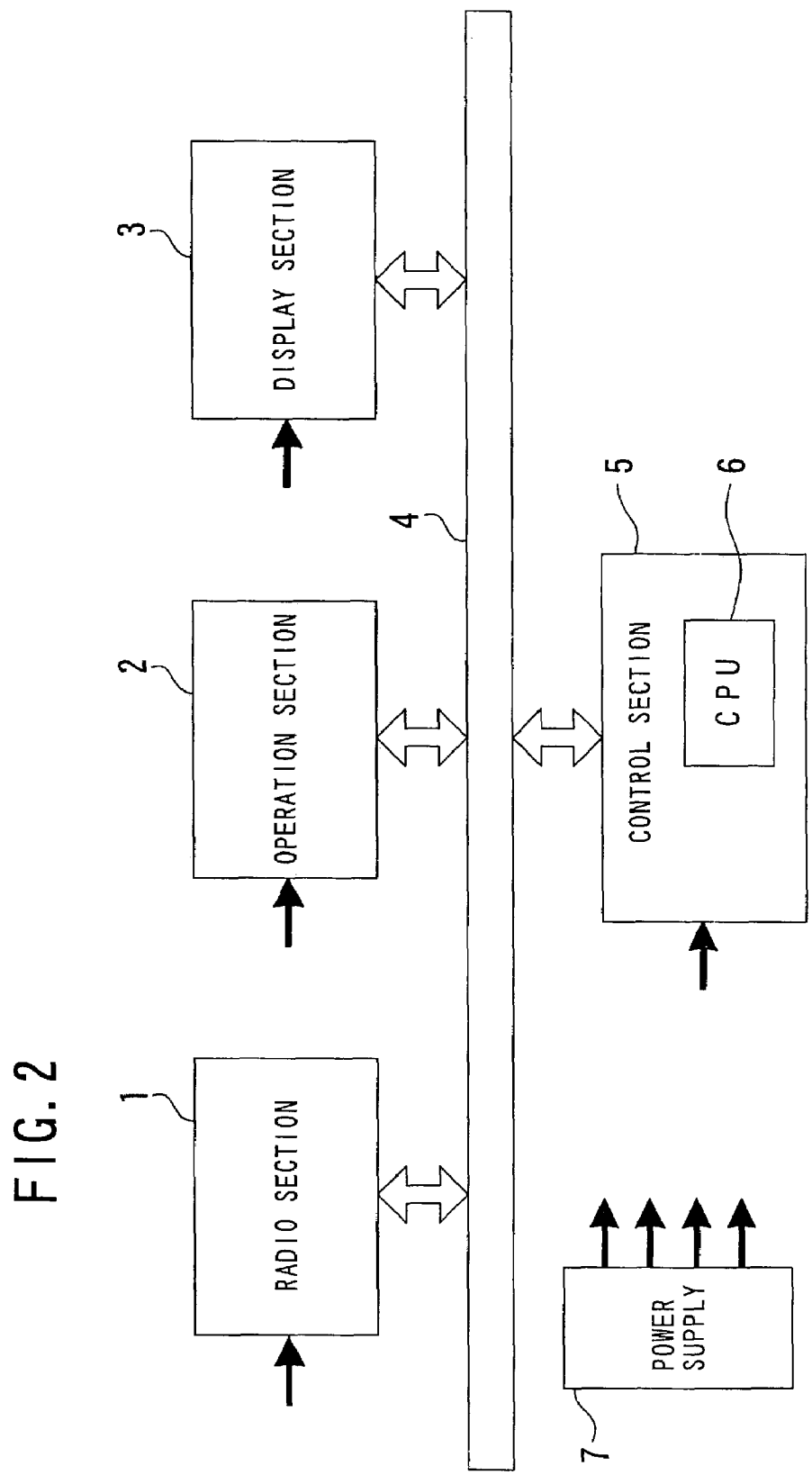
FIG. 2 is a block diagram showing a configuration of a portable telephone set to which the communication inquiring method according to the present invention is applied and which itself is an apparatus according to the present invention.

FIG. 2 is a block diagram showing a configuration of a portable telephone set according to the present invention. Referring to FIG. 2, the portable telephone set includes a radio section 1 for performing a normal communication function, a telephone answering service function and a mail service function including packet communication such as the i-mode by radio, an operation section 2 formed from operation keys and so forth provided in a predetermined arrangement for accepting several operations by a user, a display section 3 for performing display regarding various kinds of information, a control section 5 for generally controlling the radio section 1, operation section 2 and display section 3 through a transmission line (bus) 4, and a power supply 7 for supplying power to the sections. The control section 5 includes a CPU 6.

The portable telephone set of FIG. 2 is configured such that the communication inquiring operation by the method described above is executed based on an application program and so forth possessed by the CPU 6 in the control section 5 or data storage means such as a specific memory. Further, if application programs ready for embodiments hereinafter described with reference to FIGS. 3 and 4 are applied, then the portable telephone set can be configured as the embodiments which execute communication inquiring operations illustrated in FIGS. 3 and 4.

Figure 3:
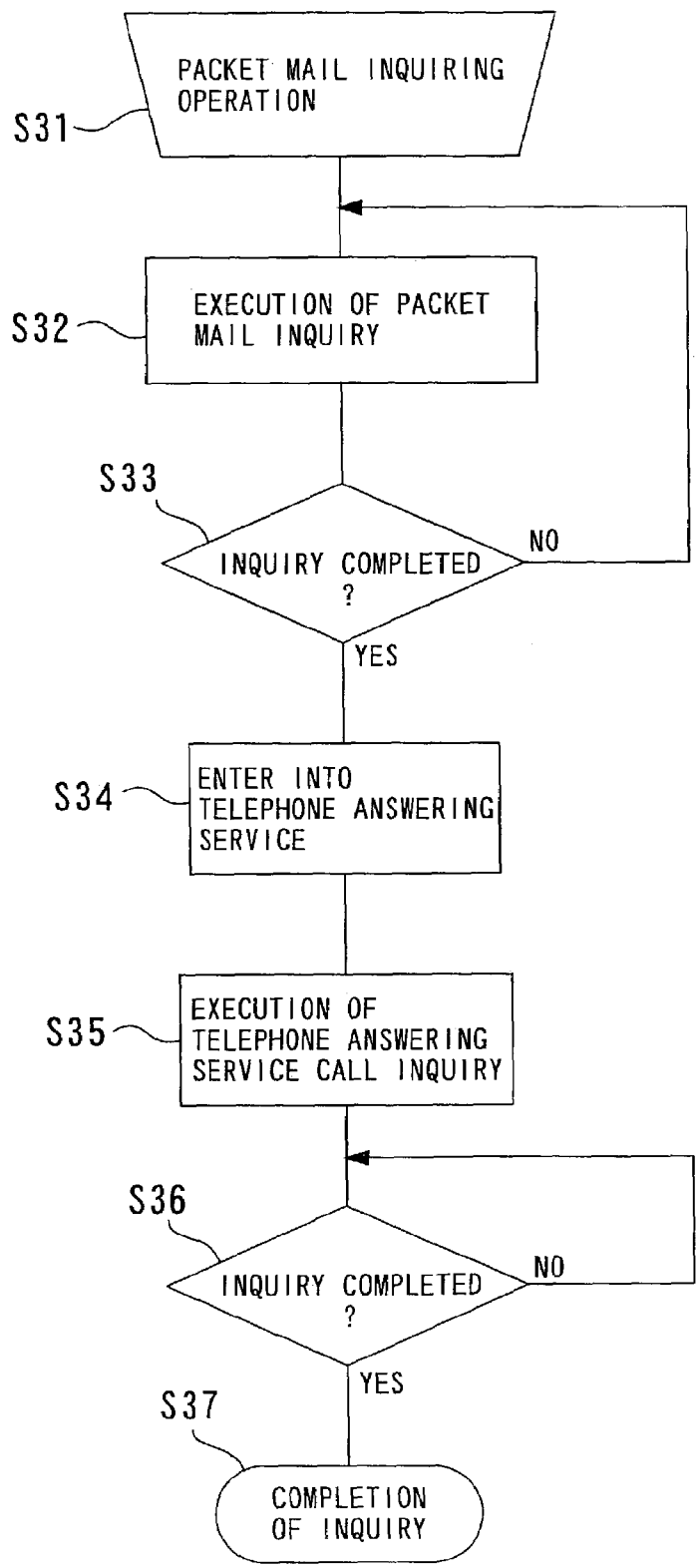
FIG. 3 is a flow chart illustrating another communication inquiring method to which the present invention is applied.
Figure 4:
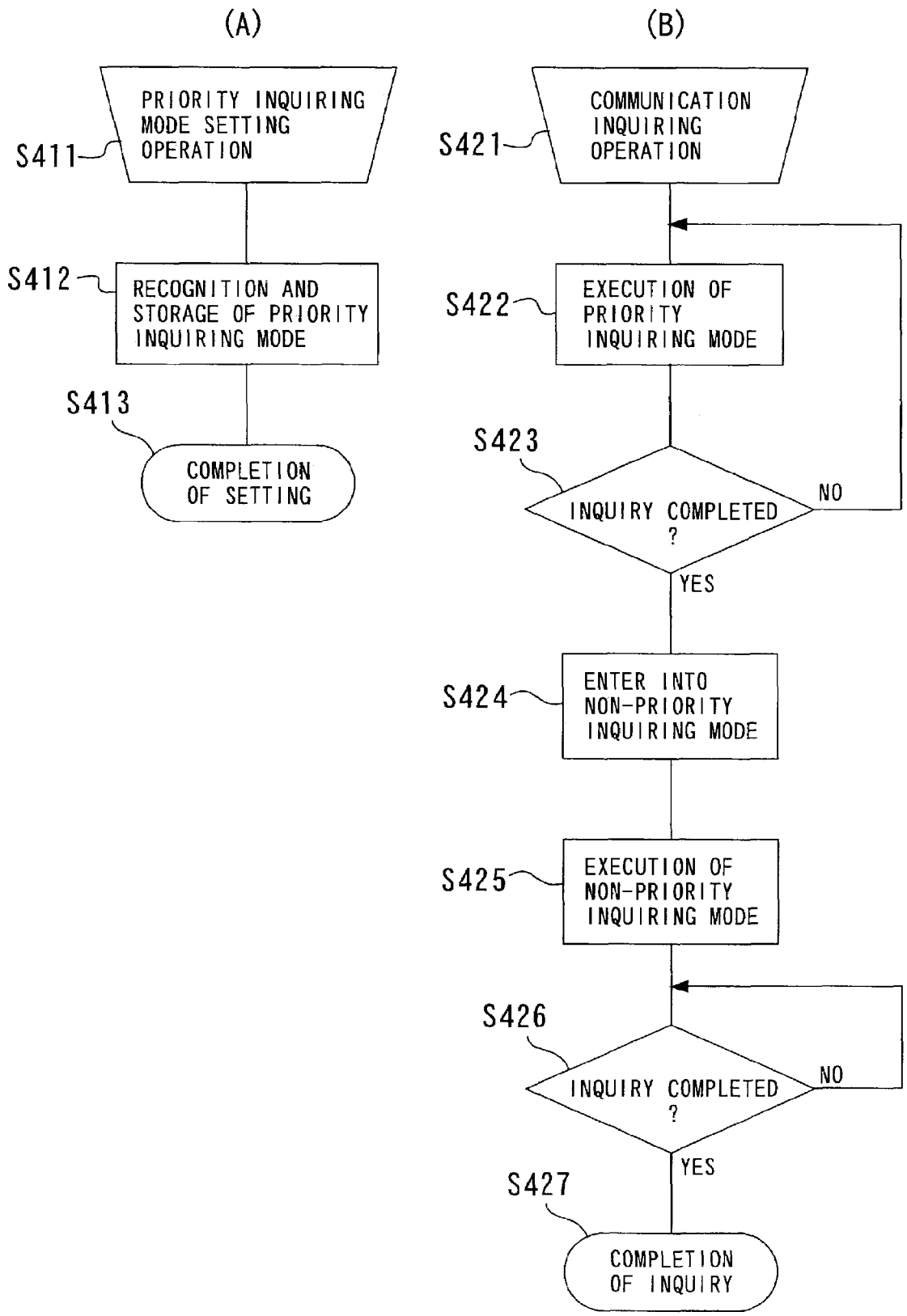

FIG. 3 is a flow chart illustrating another communication inquiring method to which the present invention is applied. Also in this embodiment, a portable telephone set having both functions of a telephone answering service function for performing issuing of a termination notification of a telephone answering service call and transmission of communication contents and a mail service function for performing issuing of a termination notification of a mail and transmission of contents of a mail is used. However, while, in the embodiment of FIG. 1, the inquiring operation as to a telephone answering service is executed in priority, in the present embodiment, an inquiring operation as to a mail service (packet mail) is executed in priority. Referring to FIG. 3, if a user performs inquiry as to whether or not a packet mail is terminated (step S31), then the portable telephone set executes inquiring action as to a packet mail with a predetermined protocol (step S32). If it is recognized that the packet mail inquiring action is completed (step S33), then the portable telephone set enters a mode of a telephone answering service (step S34). After the portable telephone set enters the mode of a telephone answering service, a protocol for inquiring operation as to a telephone answering service in this mode is executed (step S35). If it is recognized that the telephone answering service inquiring action is completed (step S36), then all of the communication inquiring actions are completed (step S37).

Also according to the embodiment of FIG. 3, since an inquiry as to a mail service (packet mail) and an inquiry as to a telephone answering service are successively and automatically executed by one inquiring operation, such a troublesome operation that a user is obliged to individually perform a telephone answering service inquiring operation and an inquiring operation as to a mail independently of each other as in the prior art illustrated in FIGS. 5(A) and 5(B) is eliminated. Particularly, in the embodiment of FIG. 3, the convenience to users who very often use a multiple function type service using a data communication network such as the i-mode in priority is high.

FIGS. 4(A) and 4(B) are flow charts illustrating a further communication inquiring method to which the present invention is applied, and illustrating an embodiment wherein a user can optionally and selectively set a communication inquiry which is to be executed in priority in the embodiments described with reference to FIGS. 1 and 3.

In the embodiment of FIGS. 4(A) and 4(B), referring first to FIG. 4(A), a user will first perform operation for selectively setting a communication inquiry (priority inquiring mode) to be executed in priority by an operation of a pertaining one of the keys of the operation section 2 in the block diagram of FIG. 2 and so forth (step S411). Based on the operation, whether the priority inquiring mode is set to, for example, a telephone answering service inquiry or an inquiry as to a mail service (packet mail) is recognized by the portable telephone set, and setting data regarding this recognition is stored (step S412). The recognition process and the storing of setting data just described are executed by the control section 5 in the block diagram of FIG. 2. After the setting data is stored, the setting of the priority inquiring mode is completed (step S413).

FIG. 4(B) is a flow chart illustrating action where a communication inquiring operation is performed for a portable telephone set wherein setting of a priority inquiring mode is completed as described with reference to FIG. 4(A).

If a user performs inquiry as to whether or not a communication (call termination) exists to the portable telephone set wherein the setting of a communication inquiry (priority inquiring mode) to be executed in priority described above with reference to FIG. 4(A) is completed by operating the operation section 2 (step S421), then the portable telephone set recognizes action to be executed in priority set as the priority inquiring mode such as, for example, one of actions of a telephone answering service inquiry and an inquiry as to a mail service (packet mail), and executes inquiring action as to a communication (call termination) using a protocol ready for this recognition (step S422). If it is recognized that the action of the priority inquiry is completed (step S423), then the portable telephone set enters a non-priority mode not set as the priority mode described above such as, for example, the other mode not executed in priority which is one of the telephone answering service inquiry and the inquiry as to a mail service (packet mail) (step S424). After the portable telephone set enters the non-priority mode, a protocol of inquiring operation as to a communication in this mode is executed (step S425). If it is recognized that the inquiring action of the non-priority mode is completed (step S426), then all of the communication inquiring actions are completed (step S427).

In the embodiment of the present invention described above with reference to FIGS. 4(A) and 4(B), a communication inquiring function having high convenience and conforming to an object of use and an intention of a user is achieved based on optional setting of the user.

While preferred embodiments of the present invention have been described using specific terms, such description is for illustrative purposes only, and it is to be understood that changes and variations may be made without departing from the spirit or scope of the following claims.

What is claimed is:

1. A mobile telephone communication inquiry method, for determining a status of each of two communication services, said method comprising:
   setting a user determined prioritization of said two communication services, said prioritization being indicative of a higher priority communication service and a lower priority communication service of the two communication services; and
   performing a communication service status inquiry, said status inquiry performing the steps of:
      contacting said higher priority communication service;
      determining a status of said higher priority communication service, said status indicating if communication content is presently being stored at a remote storage corresponding to said higher priority communication service;
      retrieving said stored communication content corresponding to said higher priority communication service, if said status indicates that communication content is presently being stored at said higher priority communication service remote storage;
      contacting said lower priority communication service after contacting said higher priority communication service;
      determining a status of said lower priority communication service, said status indicating if communication content is presently being stored at a remote storage corresponding to said lower priority communication service and
      retrieving said stored communication content corresponding to said lower priority communication service, if said status indicates that communication content is presently being stored at said lower priority communication service remote storage
   said status inquiry retrieves said stored communication content corresponding to said higher priority communication service and said lower priority communication service in succession and in one inquiring operation.

2. The method of claim 1, wherein a first communication service of said two communication services is a telephone answering service, and a second communication service of said two communication services is an electronic mail service.

3. The method of claim 2, wherein said electronic mail service transmits said communication content by packet communication.

4. A mobile telephone set disposed for receiving voice and data communication content, said mobile telephone set comprising:
   priority setting means for setting a user determined prioritization of two communication services, said prioritization being indicative of a higher priority communication service and a lower priority communication service of the two communication services, one communication service being voice-based and a second communication service being data-based; and
   status inquiry means, said status inquiry means comprising:
      first connection means for contacting said higher priority communication service;
      first status determining means for determining a status of said higher priority communication service, said status indicating if communication content is presently being stored at a remote storage corresponding to said higher priority communication service;
      first retrieval means for retrieving said stored communication content corresponding to said higher priority communication service, if said stats indicates that communication content is presently being stored at said higher priority communication service remote storage;
      second connection means for contacting said lower priority communication service after contacting said higher priority communication service;
      second stats determining means for determining a stats of said lower priority communication service, said stats indicating if communication content is presently being stored at a remote storage corresponding to said lower priority communication service and
      second retrieval means for retrieving said stored communication content corresponding to said lower priority communication service, if said stats indicates that communication content is presently being stored at said lower priority communication service remote storage;
   said stats inquiry means retrieves said stored communication content corresponding to said higher priority communication service and said lower priority communication service in succession and in one inquiring operation.

5. The mobile telephone set of claim 4, wherein said voice-based service is a telephone answering service, and said data-based service is an electronic mail service.

6. The mobile telephone set of claim 5, wherein said electronic mail service transmits said communication content by packet communication.

* * * * *